Oct. 4, 1932.  P. F. GRUVER  1,880,387
GRAIN PAN AND GRAIN SHOE
Filed Aug. 25, 1930   2 Sheets-Sheet 1
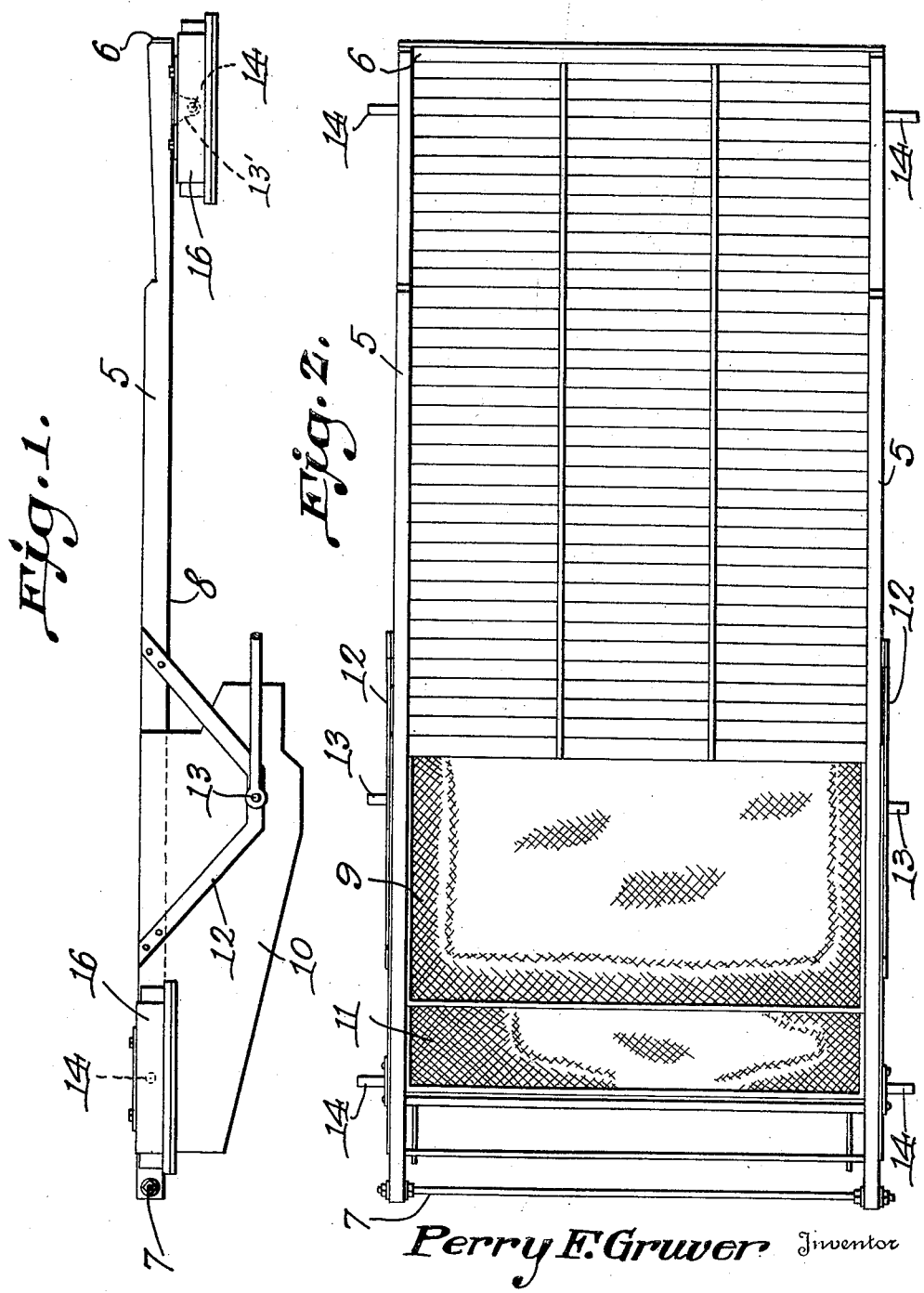
Perry F. Gruver  Inventor
By C. A. Snow & Co.
Attorneys.

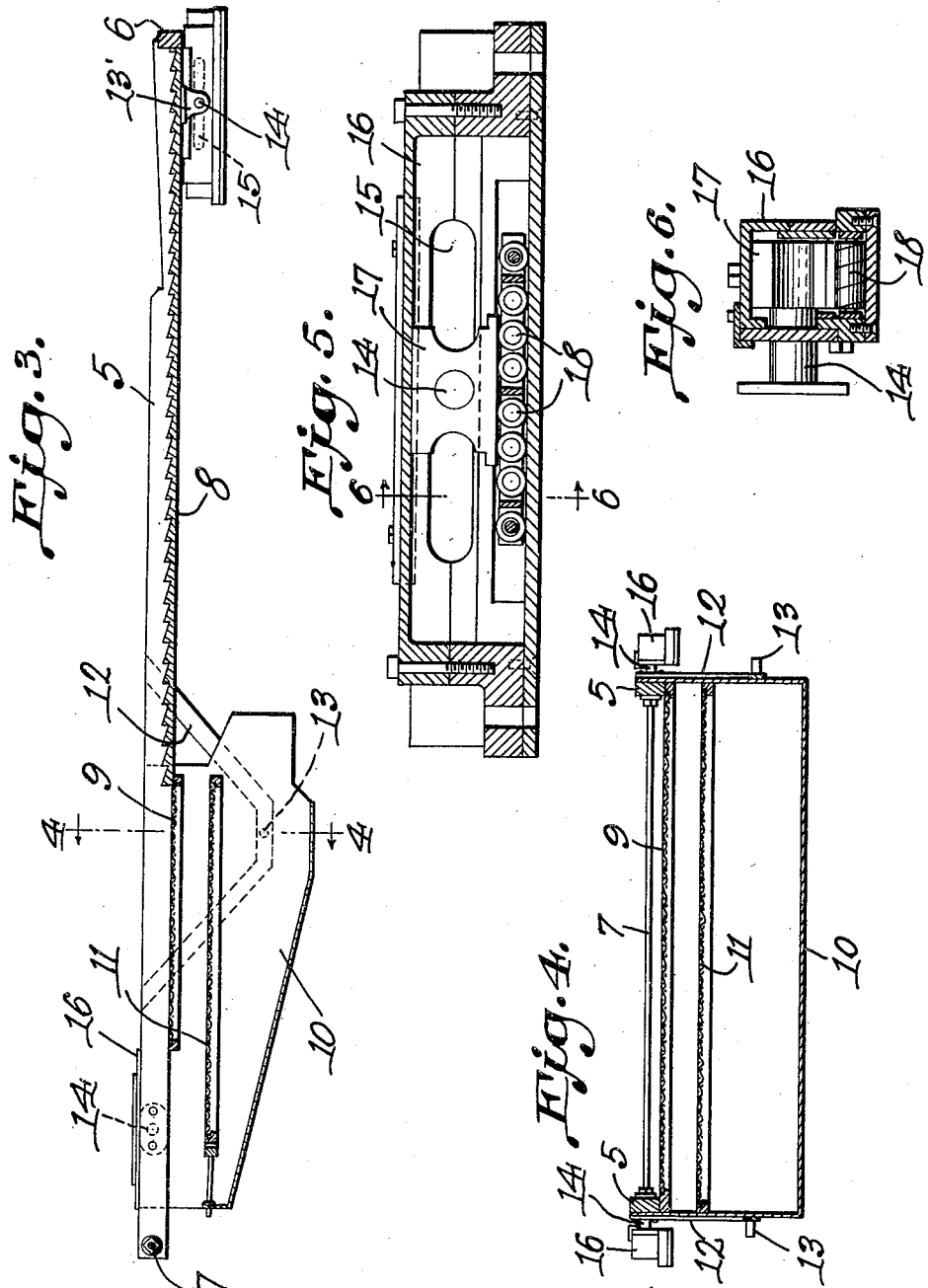

Patented Oct. 4, 1932

1,880,387

UNITED STATES PATENT OFFICE

PERRY F. GRUVER, OF GRUVER, TEXAS

GRAIN PAN AND GRAIN SHOE

Application filed August 25, 1930. Serial No. 477,707.

This invention relates to combines, the primary object of the invention being to provide a grain pan and grain shoe constructed as a unit for use as a part of the combine, thereby eliminating the necessity of providing independent operating means for the grain shoe and grain pan.

Another object of the invention is to provide a combine grain pan and grain shoe operated and supported on a reciprocating roller bearing, eliminating the use of the pivoted hanger arms usually employed in combine construction.

A still further object of the invention is the provision of means for supporting the grain pan and grain shoe of a combine, to permit the operation thereof with the minimum amount of power.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a device constructed in accordance with the invention.

Figure 2 is a plan view thereof.

Figure 3 is a longitudinal sectional view through the device.

Figure 4 is a sectional view taken on line 4—4 of Figure 3.

Figure 5 is an enlarged sectional view through the roller bearing member of the device.

Figure 6 is a sectional view taken on line 6—6 of Figure 5.

Referring to the drawings in detail, the device comprises a frame embodying side bars 5 connected at their forward ends by means of a bar 6. The rear ends of the bars 5 are connected by means of the tie rod 7. The grain pan is indicated by the reference character 8, and is of the usual and well known construction, one end of the grain pan being disposed adjacent to one end of the upper sieve 9 of the grain shoe 10.

As shown, the grain shoe is also supported between the bars 5 and is constructed in such a way that it will reciprocate with the grain pan, to the end that the mechanism for operating the grain pan will accomplish the operation of the grain shoe, eliminating the necessity of providing separate operating means for the grain pan and grain shoe.

Supported directly under the sieve 9, is a larger sieve 11 onto which material falls in passing from the upper sieve 9. Secured to opposite sides of the device, are hangers 12 that extend downwardly an appreciable distance, where they are supplied with suitable shafts 13 to which suitable power rods, not shown, are connected, to impart movement to the device.

Brackets 13′ extend downwardly from the frame of the device, and are supplied with laterally extended stub shafts 14 that extend through the slots 15 of the bearing housings 16, where they connect with the shoes 17 which in turn rest on the rollers 18 that are held in suitable cages within the bearing housings. It is of course understood that these bearing housings are supported in any suitable manner, however, in most combines the housings may be secured to the side bars of the frame of the combine.

From the foregoing it will be seen that due to the construction shown and described, I have provided a unit embodying a grain pan and grain shoe, with the result that the operating mechanism may be reduced to the minimum, and the power employed in imparting movement to the unit, may be greatly reduced.

I claim:

In a device of the class described, a frame, a grain pan supported by the frame, stub shafts extending laterally from the frame, roller bearing housings disposed at opposite sides of the frame near one end thereof, each of said roller bearing housings including a lower section and an upper section, there being lateral elongated openings formed in the sides of the housings to receive the stub shafts, roller bearing cages having roller bearings, mounted within the housings, shoes mounted on the roller bearings and engaging the upper sections of the housings to hold the shoes in proper alignment, and said shoes having openings to receive the stub shafts to connect the stub shafts and shoes.

In testimony that I claim the foregoing as my own, I have hereto affixed my signature.

PERRY F. GRUVER.